(12) United States Patent
Beard et al.

(10) Patent No.: US 10,474,575 B2
(45) Date of Patent: Nov. 12, 2019

(54) CACHE-BASED COMMUNICATION BETWEEN EXECUTION THREADS OF A DATA PROCESSING SYSTEM

(71) Applicant: ARM Ltd, Cambridge (GB)

(72) Inventors: Jonathan Curtis Beard, Austin, TX (US); Eric Van Hensbergen, Austin, TX (US)

(73) Assignee: Arm Limited, Cambridge (GB)

( * ) Notice: Subject to any disclaimer, the term of this patent is extended or adjusted under 35 U.S.C. 154(b) by 272 days.

(21) Appl. No.: 15/483,036

(22) Filed: Apr. 10, 2017

(65) Prior Publication Data

US 2018/0293169 A1 Oct. 11, 2018

(51) Int. Cl.
| | |
|---|---|
| G06F 11/10 | (2006.01) |
| G06F 12/0831 | (2016.01) |
| G06F 12/1045 | (2016.01) |
| G06F 12/0875 | (2016.01) |
| G06F 13/42 | (2006.01) |
| G06F 12/0813 | (2016.01) |
| G06F 13/16 | (2006.01) |

(52) U.S. Cl.
CPC ...... *G06F 12/0831* (2013.01); *G06F 11/1064* (2013.01); *G06F 12/0813* (2013.01); *G06F 12/0833* (2013.01); *G06F 12/0875* (2013.01); *G06F 12/1054* (2013.01); *G06F 13/1668* (2013.01); *G06F 13/4282* (2013.01); *G06F 2212/60* (2013.01); *G06F 2212/621* (2013.01); *G06F 2212/68* (2013.01)

(58) Field of Classification Search
None
See application file for complete search history.

(56) References Cited

U.S. PATENT DOCUMENTS

| | | | |
|---|---|---|---|
| 5,644,752 A | 7/1997 | Cohen et al. | |
| 8,505,013 B2 | 8/2013 | Pollock et al. | |
| 8,909,872 B1 | 12/2014 | Schlansker et al. | |
| 2005/0152435 A1* | 7/2005 | Lesartre | G06F 13/4282 375/130 |
| 2006/0236011 A1 | 10/2006 | Narad et al. | |
| 2006/0259734 A1* | 11/2006 | Sheu | G06F 12/1036 711/203 |
| 2012/0117223 A1* | 5/2012 | Jennings | G06F 9/542 709/224 |
| 2012/0191949 A1 | 7/2012 | Gonion | |

(Continued)

*Primary Examiner* — Craig C Dorais
(74) *Attorney, Agent, or Firm* — Leveque IP Law, P.C.

(57) ABSTRACT

A virtual link buffer provides communication between processing threads or cores. A first cache is accessible by a first processing device and a second cache accessible by a second processing device. An interconnect structure couples between the first and second caches and includes a link controller. A producer cache line in the first cache stores data produced by the first processing device and the link controller transfers data in the producer cache line to a consumer cache line in the second cache. Each new data element is stored at a location in the producer cache line indicated by a store position or tail indicator that is stored at a predetermined location in the same cache line. Transferred data are loaded from a location in the consumer cache line indicated by a load position or head indicator that is stored at a predetermined location in the same consumer cache line.

24 Claims, 11 Drawing Sheets

(56) References Cited

U.S. PATENT DOCUMENTS

| | | |
|---|---|---|
| 2013/0326201 A1 | 12/2013 | Gopal et al. |
| 2014/0208031 A1 | 7/2014 | Raikin et al. |
| 2015/0242210 A1 | 8/2015 | Kim et al. |
| 2015/0293785 A1 | 10/2015 | Murphy |
| 2017/0200094 A1 | 7/2017 | Bruestle et al. |

* cited by examiner

CACHE-BASED COMMUNICATION BETWEEN EXECUTION THREADS OF A DATA PROCESSING SYSTEM

GOVERNMENT LICENSE RIGHTS

This invention was made with Government support under the Fast Forward 2 contract awarded by DOE. The Government has certain rights in this invention.

TECHNICAL FIELD

The present disclosure relates to a hardware-accelerated directed communication channel implemented using caches in a data processing system. The communication channel has application for data transfer between execution threads in a data processing system.

BACKGROUND

Data processing systems commonly execute a number of threads. The execution threads may be performed serially on single serial processor using time-slicing, in parallel on a number of linked processing cores, or a combination thereof. In many applications, there is a desire to pass data from one execution thread to another via a data channel. Moreover, the data may be passed in a specified pattern. For example, a first-in, first-out (FIFO) communication pattern is inherent in many applications, where data is entered sequentially into a storage medium and is removed from the storage medium in the same sequential order. Thus, the first data stored in the medium will be the first data taken out. A FIFO may be implemented explicitly as a buffer in hardware or it may implement in software. In other applications, the order of the data is not important, but the data is still generated by a producer and directed towards a consumer.

It is well known that processes and threads executing in a data processing system may share information through use of a common storage, either a physical storage medium or a virtual address space. However, in this kind of communication, information is not directed from one process or thread to another. Directed communication may be achieved using software in conjunction with a shared memory, but transmission of data from one thread to another consumes valuable processor resources (e.g., through locks, false sharing, etc.). These events conspire to increase latency, increase energy usage, and decrease overall performance. Similarly, transmission of data from one processing core to another requires communication through multiple layers of cache hierarchy.

DETAILED DESCRIPTION OF THE EMBODIMENTS

Figure 1:
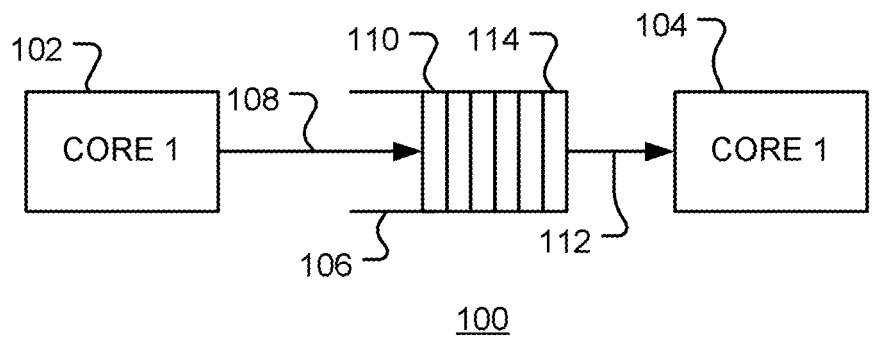
FIG. 1 is a diagrammatic representation of a first-in, first-out (FIFO) buffer.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

The present disclosure relates to a hardware accelerated, directed communication channel, implemented using caches and a link controller, for providing a data link between execution threads in a data processing system. The communication channel provides a virtual link buffer. For example, the caches may be used to implement ordered communication of data (such a first-in, first-out (FIFO) pattern, or a last-in, last-out (LIFO) pattern), or unordered communication.

FIG. 1 is a diagrammatic representation of a system 100 in which data is transferred between first processing core 102 and second processing core 104 using a first-in, first-out (FIFO) buffer 106. Data 108 produced by first processing core 102 is added to the tail 110 of buffer 106 and data 112 is consumed by the second processing core 104 from the head 114 of the buffer 106. Buffer 106 may be implemented in dedicated hardware.

Figure 2:
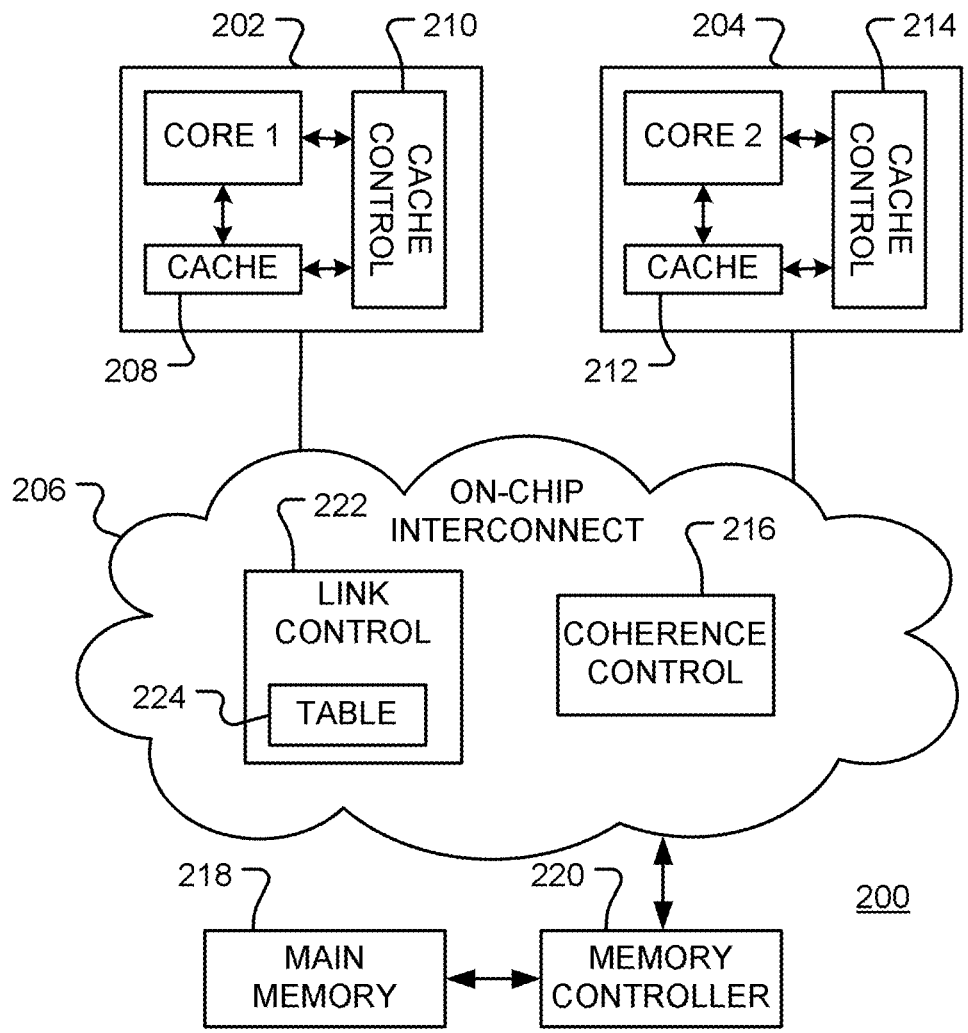
FIG. 2 is a simplified diagram of a data processing system for implementing a virtual link buffer, in accordance with embodiments of the disclosure.

FIG. 2 is a simplified diagram of a data processing system 200. By way of example, system 200 comprises first processing device 202 and second processing device 204 that are coupled by an interconnect structure 206. Devices 202 and 204 and interconnect structure 206 may be implemented on the same chip (as shown) or on separate chips. In general, system 200 may have any number of devices. First processing device 202 includes at least one cache 208 together with a cache controller 210. Similarly, second processing device 204 includes at least one cache 212 together with a cache controller 214. The at least one cache may be a hierarchy of caches, such as level one (L1) cache and a level two (L2) cache. Interconnect structure 206 includes a coherence controller 216 that controls data flow between the caches 208 and 212 and a main memory 218. In this example, the main memory 218 is accessed via interconnect structure 206 and memory controller 220. In operation, the first and second processing devices both access main memory 218. To speed operation, copies of data may be held in caches 208 and 212. Coherence controller 216 ensures that data accessed by the first and second processing devices is up to date and has not been modified by another device.

A FIFO, LIFO or other communication pattern implemented in software alone would have to operate via multiple layers of cache hierarchies 208 and 212. The communication channel would have a large latency as a result of multiple cache misses and snoop operations. A software implemented FIFO, for example, might require more than 70 instructions or micro-operations to perform a single push or pop operation.

In accordance with an embodiment of the disclosure, a virtual link buffer between execution threads is implemented using one or more cache lines in caches 208 and 212. Control of the cache lines, used to implement a virtual link buffer, is provided by link controller 222. Link controller 222 may be implemented in interconnect structure 206. Link controller 222 is implemented in hardware and provides hardware acceleration for direct communication between producer and consumer device.

Link controller 222 may maintain a table 224 to track cache lines being used as link buffers. This approach provides hardware support for linked execution threads using existing cache systems. Communication is achieved that is analogous to an explicit hardware implementation. While the link controller is implemented in hardware, use is made of the existing cache and interconnect structures. Thus, communication is achieved without the cost (in terms of hardware area, static energy, etc.) of a full hardware solution.

The existing cache hierarchy provides a means to signal directly from one thread to another or from one processing core to another. Communication may take place within a single core (L1), across shared cache (L2 or L3), or even across multiple cores when backed by a virtual memory system or across multiple nodes when using a globally accessible addressing scheme.

In accordance with some embodiments, a data processing system is provided for implementing a virtual link buffer. The data processing system includes a first cache accessible by a first processing device, a second cache accessible by a second processing device and an interconnect structure that couples the first cache and the second cache, the interconnect structure comprising a link controller. A producer cache line in the first cache is configured to store a plurality of data elements produced by the first processing device. The link controller is configured to transfer data elements in the producer cache line to a consumer cache line in the second cache. The consumer cache line is configured to provide the plurality of data elements, produced by the first processing device, to the second processing device.

The data elements may be produced in sequence, where each data element is stored at a location in the producer cache line indicated by a store position indicator, where the store position indicator is stored at a predetermined location in the producer cache line and where the first cache controller is configured to access the tail indicator. The store position indicator may be referred to herein as a tail indicator for a queue-like data buffer or as a top indicator for a stack-like data buffer.

A second cache controller may be provided, where a data element is loaded from a location in the consumer cache line indicated by a load position or head indicator, where the load indicator is stored at a predetermined location in the consumer cache line and where the second cache controller is configured to access the load position indicator. The load position indicator may be referred to herein as a head indicator for a queue-like data buffer of a top indicator for a stack-like data buffer.

The producer cache line may be associated with a producer handle and the consumer cache line associated with a consumer handle. The producer handle and the consumer handle are stored in a table in a memory and are accessible by the link controller.

The link controller may be configured to buffer data elements transferred from the producer cache line to the consumer cache line in the memory and to maintain an order of buffered data elements.

The first processing device and the second processing device may be integrated with the data processing system.

A first virtual address for identifying a cache line in a cache of the producer processing device is associated with a second virtual address for identifying a cache line in a cache of the consumer processing device. In accordance with some embodiments, a virtual link buffer is provided between the producer processing device and the consumer processing device in a data processing system by storing, by the producer processing device, one or more data elements in a first cache line of the producer processing device, the first cache line identified by the first virtual address, transferring, by a link controller in an interconnect structure that couples the producer and consumer processing devices, the one or more data elements in the first cache line to a second cache line in the cache of the consumer processing device, the second cache line identified by the second virtual address. The consumer processing device may then load the one or more data elements from the second cache line.

The data elements may be produced and consumed in sequence. In some embodiments, the producer device reads a store position indicator from a designated location in the first cache line, stores the data element at a location in the first cache line indicated by the store position indicator and updates the store position indicator.

The consumer device reads load position indicator from a designated location in the second cache line, loads the data element at a location in the second cache line indicated by the load position indicator and updates the load position indicator.

The first virtual address may be translated to a first physical address in a storage device of the data processing system and the first cache line identified from the first physical address.

The link controller may allocate a producer handle comprising a pseudo-address for enabling the producer processing device to reference the virtual link buffer and a consumer handle comprising a pseudo-address for enabling the consumer processing device to reference the virtual link buffer. These handles may be associated with one another in a table, for example. In some embodiments, the link controller may only provide a single pseudo-address serving as a common handle to both producer and consumer.

In some embodiments, the first cache line is transferred to the link controller, stored in a line buffer in a memory of the data processing system and, at a later time, transferred the first cache line from the line buffer to the second cache line of the consumer processing device. The line buffer may be a first-in, first-out line (FIFO) buffer or a first-in, last-out (FILO) line buffer, or in a relaxed ordering between producer and consumer. In other embodiments, the link controller may be configured via signal to perform one of the aforementioned orderings.

Order of lines stored in the line buffer may be maintained by the link controller by accessing a memory, where the memory contains one or more of a table, a head pointer, a tail pointers, or a linked list. A coherence state of the cache lines stored in the line buffer may be maintained to enable consumption of data by more than one consumer processing device (as specified by the producer-consumer routing table).

Data elements in the first cache line may be transferred to the second cache line by the link controller receiving a request from the consumer processing device for data associated with the second virtual address allocated to the virtual link buffer and determining if one or more cache lines associated with the virtual link buffer are stored the line buffer. When one or more cache lines associated with the virtual link buffer are stored the line buffer, a cache line of one or more stored caches lines is selected and the contents transferred to the consumer processing device.

In further embodiments, transferring the one or more data elements in the first cache line to the second cache line comprises the link controller receiving a request from the consumer processing device for data associated with the second virtual address allocated to the virtual link buffer, identifying the first virtual address allocated to the virtual link buffer, requesting a cache line associated with the identified first virtual address from the producer processing device and transferring a cache line received from the producer processing device to the consumer processing device.

Requesting the cache line associated with the identified first virtual address from the producer processing device may comprise requesting a cache line associated with a physical address that maps to the identified first virtual address.

After reading a store position indicator from a designated location in the first cache line, it may be determined from the store position indicator if the first cache line is full and the first cache line may be transferred to the link controller when the first cache line is full.

Alternatively, the first cache line may be transferred from the buffer in memory to the cache line of the second cache line in response to a signal from the consumer processing device.

Alternatively, a non-full first cache line may be transferred from the producer to the consumer in response to a signal from the link controller, which is generated by a consumer signaling demand for data across the link.

The one or more data elements in the first cache line may be rearranged before transferring to the second cache line.

Figure 3:
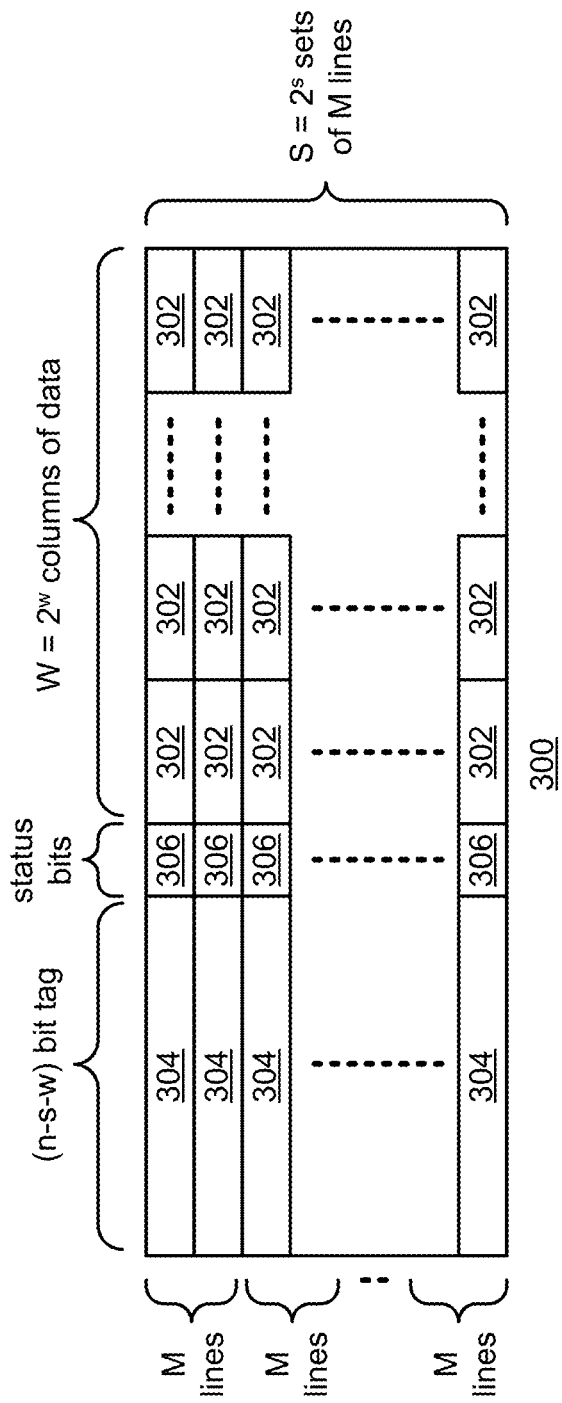
FIG. 3 is a diagrammatic representation of an example of a cache memory.

FIG. 3 is a diagrammatic representation of a cache memory 300. Data is stored in blocks 302 that are, at least conceptually, arranged as an array having a number W of columns and a number of lines. The lines are conceptually grouped as S sets of M lines. For ease of access, $W=2^w$, $S=2^s$ and $M=2^m$ are often selected to be powers of 2. In one example, each block 302 is a byte of data, w=6, s=12 and m=0, so that W=64, S=4096, and M=1. The location of the original data, of which blocks 302 are copies, is identified by tags 304 and by the location of the data within the array. In addition, each cache line includes one or more status bits 306. The status bits may indicate, for example, if the data in line is valid or invalid, and permissions associated with the data. For example, status bits 306 might indicate the MESI state of the data (i.e. whether the data is Modified, Exclusive, Shared or Invalid). The tags 304 and status bits 306 are herein termed 'metadata'.

In one embodiment, the status bits 306 include a bit that indicates the cache line is to be accessed as a virtual link buffer. In a further embodiment, the status bits 306 include a first bit that indicates if the cache line is to be accessed as a producer link buffer and a second bit that indicates if the cache line is to be accessed as a consumer link buffer. This enables the cache controller to determine how the cache line should be accessed.

The tag and data structures may be separated into two, with conceptually the same numbers of sets/ways, so a match found in a region of the tag array has a corresponding region in the data array. The data RAM may comprise multiple RAMs that can be individually accessed, so that, when a match is found in the tag array, the correct data element can be accessed.

Figure 4:
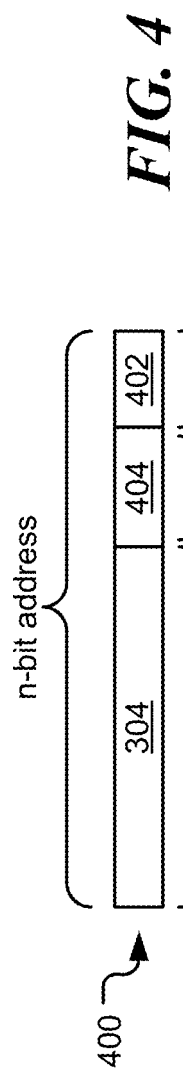
FIG. 4 is a diagrammatic representation of an address in a backing storage device, such as a main memory.

FIG. 4 is a diagrammatic representation of an address 400 in a backing storage device, such as a main memory. The address 400 has n bits. For example, in some data processing systems, n=64. The lowest w bits 402 of the address 400 may be used as a column offset that indicates which data column of cache 300 could contain a copy of the data stored at that address in the backing memory. The next s bits 404 of the address 400 comprise a set index that indicates which set of cache lines could contain the copy of the data. The upper t bits of the address are used as tag for the address, where t=n−s−w. When M=1, the cache is directly mapped and a copy of the data is stored in the cache if the tag matches the tag stored at the cache line indicated by the set index. When M>1, a copy of the data is stored in the cache if the tag matches the tag stored at any cache line in the set of lines indicated by the set index. If the tag does not match any of the M tags in the set, the data is known to be not in the cache.

A virtual link buffer uses cache lines as the means for transporting the data that resides within the link buffer, and simultaneously for packaging elements of the link state within each cache line. As an example, a cache line used as a virtual LIFO or stack buffer may have the following structure:

```
typedef struct fifo__line /** 64-byte cache line example **/
{
    uint16_t                /** 2-bytes, 8-bits per byte **/
        top__index          /** index to read/write **/: 6,
        ele__size           /** number of bytes **/: 3,
        reserved            /** extra bits       **/: 7;
    uint8_t data[ 62 ]      /** 62-bytes, 8-bits per byte **/;
} /** 64-bytes total or 1-cache line **/;
```

The seven reserved bits could be used to address larger sizes atomically (i.e., a vector) or they could be used for protections or other metadata.

As a further example, a cache line used as a virtual FIFO buffer may have the following structure:

```
typedef struct fifo__line /** 64-byte cache line example **/
{
    uint16_t                /** 2-bytes, 8-bits per byte **/
        head__index         /** index to read    **/: 6,
        tail__index         /** index to write   **/: 6,
        ele__size           /** number of bytes  **/: 3,
        reserved            /** extra bits       **/: 1;
    uint8_t data[ 62 ]      /** 62-bytes, 8-bits per byte **/;
} /** 64-bytes total or 1-cache line **/;
``` where the range can address the entire 62 bytes stored in the line, the element size can adjust the size of data being addressed from a single byte through to 8 bytes.

Figure 5:
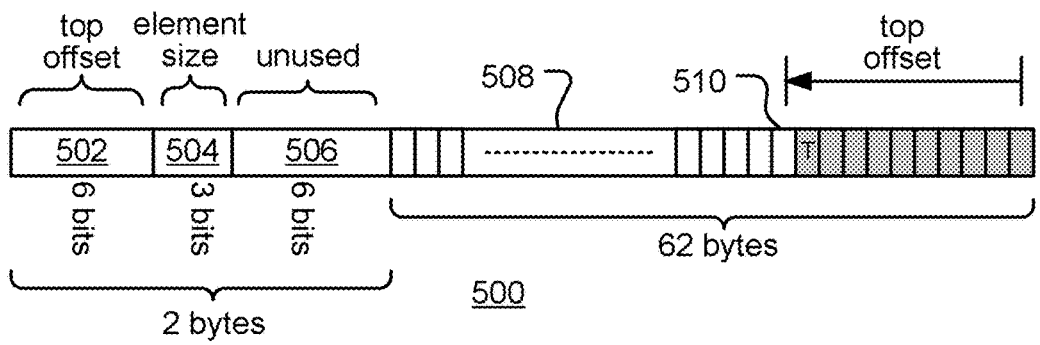
FIG. 5 is a diagram of a data block of a single cache line of a producer device, in accordance with embodiments of the disclosure.

FIG. 5 is a diagram of a data block 500 of a single cache line used as a virtual LIFO buffer or stack. In this example, the data block contains 64 bytes, but data blocks of other sizes may be used. FIG. 5 shows an example of how data in a cache line may be arranged for use as a virtual link buffer in a cache of a processing device that is a producer of data to be transferred via the virtual link buffer or a consumer device that receives the data. In this example, the right-most 62 bytes 508 are used to store buffer data, while the left-most two bytes are used to store metadata relating to the data in the virtual link buffer. The metadata fields in this example include 6-bits field 502 for storing an indicator or index of the last-in, first-out element (i.e. the top of the stack) and 3 bit field 504 indicating the length of each data element stored in the buffer. The remaining 7 bits are unused. In one embodiment, data is written to the cache in sequential order starting with the right-most entry, which is the head (H) of the buffer. The top index, stored in field 502, indicates the number of bytes stored in the virtual link buffer and also indicates the position 510 where the next data value is to be written (or the previous data value was read). The most recently written byte is the top (T) of the buffer. In FIG. 5, data has been written to the 'gray' byte locations.

As described above, each cache line includes a tag which normally identifies a region of memory. When a cache line is used as a virtual link buffer, it is allocated a specific address. In one embodiment, a set of addresses in virtual memory may be predefined and reserved for use with virtual link buffers.

The disclosure is described in more detail below with reference to embodiments of a FIFO communication channel (sometimes referred to as a 'queue'). However, this is but one embodiment of the disclosure. It will be apparent to those of ordinary skill that other communication patterns, such as a LIFO pattern (sometimes referred to as a 'stack'), or an unordered link may be implemented.

In one embodiment, FIFO handles are assigned by a link controller to enable reference to a particular virtual link buffer. The handles may be assigned in response to a specific instruction from a producer or consumer device store to a reserved address. The instruction is trapped to the link controller and causes allocation of the FIFO handles. The FIFO handles are referred to herein as 'pseudo-addresses', since they do not correspond to an physical memory or storage address.

In a further embodiment, the FIFO handles may be allocated in software.

The producer device may write data to the virtual link buffer using a specific instruction or by writing to the buffer address. The cache controller of the producer device recognizes from the instruction or the address that the cache line is used as a virtual link buffer, writes the data to the position in the cache line indicated by the tail indicator, and then updates the tail indicator (for example, the tail index may be modified by the element size).

For each pseudo-address or handle associated with virtual link buffer in the cache of a producer device, there is a corresponding pseudo-address or handle of a virtual link buffer that may be stored in a cache of a consumer device. This pseudo address may be predefined or assigned by the link controller, for example.

A consumer device may read data from a virtual link buffer by issuing a custom instruction (such as a 'pop' instruction) or by issuing a request to load data from the buffer address. If the corresponding cache line does not exist in the cache of the consumer device, the address is passed to the interconnect structure. The link controller determines the corresponding producer buffer address and requests the associated cache from the producer device. Data received from the producer device is forwarded to the consumer device. In this way, the consumer device obtains a copy of the virtual link buffer without a need for additional data paths in the interconnect structure.

Figure 6:
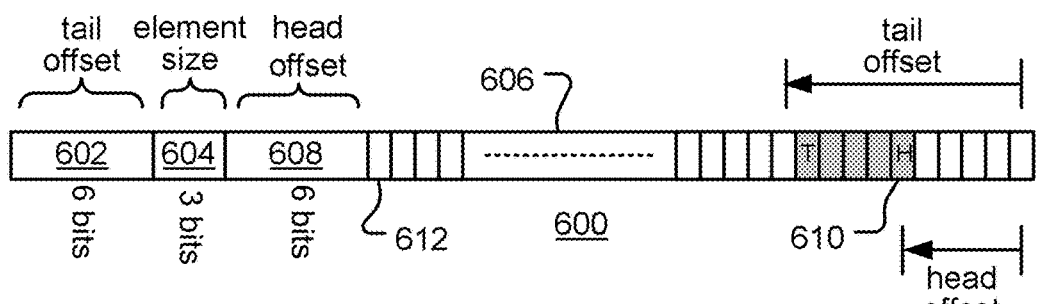
FIG. 6 is a diagram of a data block of a single cache line of a consumer device, in accordance with embodiments of the disclosure.

FIG. 6 is a diagram of a data block 600 of a single cache line, and shows an example of how data in a cache line may be arranged for use as a virtual FIFO buffer in a cache of a consumer device. The tag of the cache line indicates the address of the consumer buffer. The tail indicator field 602, element size field 604 and data field 606 are copied from the cache line of the producer device. The head indicator field 608 is initially set to zero. The head indicator field indicates the head of the buffer, that is, the position 610 from which data is to be next read from the buffer, and is incremented each time data is read. When the head indicator is equal to the tail indicator, the buffer is empty and a new request must be made to the interconnect if more data is required.

Thus, the head location 'H' holds the data value first stored in the buffer and this datum will be the first data value taken out the buffer. The tail location 'T' holds the last data value stored in the buffer and will be the last data value read out.

Figure 7:
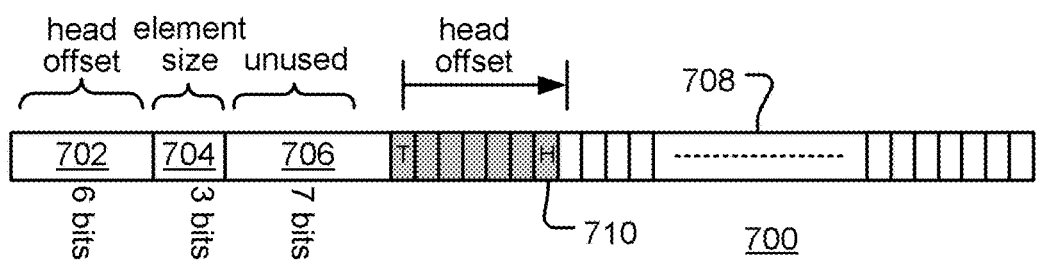
FIG. 7 is a diagram of a data block of a single cache line, in accordance with further embodiments of the disclosure.

FIG. 7 is a diagram of a data block 700 of a single cache line and shows a further example of how data in a cache line may be arranged for use as a virtual FIFO buffer in a cache of a consumer device. The head indicator field 702 is copied from the tail indicator field of the corresponding producer cache line and indicates the number of valid data entries in the buffer. The element size field 704 is copied from the producer cache line. Field 706 is unused or may be reserved for additional data. In this embodiment, the valid data in producer cache line is shifted left by the link controller during transfer, so that the tail of the buffer is at the left-most end in of the 62-byte data field 708. At each read operation, the value in the head indicator field is decremented by the cache controller of the consumer processor to determine the location 710 of the next data to be read from the buffer. When the head indicator reaches zero, the virtual link buffer is empty and a new request must be made to the interconnect if more data is required.

In a still further embodiment, data in the producer cache line is reversed when transferred to the consumer device, so that tail indicator becomes the head indicator.

In a still further embodiment, the data is transferred unchanged and all of the valid data in the consumer cache line is read in one go. In this embodiment there is no requirement to store a head indicator in the cache line.

In a still further embodiment, data in the producer cache line is transferred to the consumer device, the head indicator of field 702 is used as a valid count of data elements, and inline bits (e.g., error correction bits) are used to indicate valid offsets within the consumer cache line.

In a still further embodiment, a cache line includes a number of bits used as an error correction code (ECC). For example, one ECC bit may be allocated for each byte of data in a cache line. When a cache line is used as a virtual buffer, the ECC bits may be used to indicate if an associated byte of data is valid. In this embodiment, data bytes may be stored in any order, with the associated ECC bits in a producer cache line indicating which bytes have been written to and ECC bits a consumer cache line indicating which valid bytes have not been read yet. This embodiment enables data transfer in a predefined sequence or in a random or unspecified order.

In a still further embodiment, only full cache lines are transferred to the consumer device, in which case a tail index is not used by the consumer device.

In the embodiment disclosed above, the link controller maintains a table that records the producer-consumer pairs. In a further embodiment, the consumer address is encoded in the producer cache line itself. In operation, the link controller simply reads the consumer address from a cache line received from a producer, renames the line and passes the line over the coherence network to the consumer under the consumers address. This approach eliminates the need for a look-up table in the link controller.

In one embodiment, a virtual link buffer is implemented using specific creation, destruction and push/pop instructions. In another embodiment, standard load/store instructions are used to access a reserved region of the virtual address space.

Explicit creation of a virtual link with FIFO ordering may use the following instructions:
mkfifo,
destroy_fifo,
open_fifo_<type>.
where <type> may be 'producer' or 'consumer'. Standard load/store instructions may then be used to access the virtual FIFO buffer, once created, using the memory address.

Virtual link buffers may be used in a stream/data-flow oriented architecture. In one embodiment, all producer/consumer pseudo-address pairs are located within the same virtual memory (VM) address space. In a further embodiment, an operating system is used to map shared memory across address spaces.

Example instructions for creation of a FIFO ordered virtual link and their descriptions are listed in TABLE 1.

TABLE 1

| Instruction | Description |
| --- | --- |
| make_fifo <r1> <r2> | the first operand r1 gets a producer "handle" virtual address
the second operand r2 gets a consumer "handle" virtual address
The make_fifo instruction initializes the FIFO within the system, it creates two handles in the VM space (not real pointers, or backed by memory of any kind. These virtual addresses are used as handles within the same virtual memory space to access the FIFOs created, either by the producer or consumer.
The producer and consumer handles can be mapped using the operating system as well vs. an instruction recognized by the hardware in an analogous manner to shared memory for inter-process communication. These handles would then be registered with the link controller by a privileged process (e.g., operating system). |
| destroy_fifo <r1> | Destruction can be done by any of the producers or consumers. Optionally, both handles could be used, however within the link controller both addresses map to either side of the FIFO so either could be used to destroy it. Accessing a destroyed FIFO may throw a fault (as an example implementation). |
| open_fifo_producer <r1> <r2> | This instruction takes in two registers and is used to open a producer FIFO handle to receive an actual virtual address which can be used in conjunction with a standard store instruction.
The first operand r1 is supplied as the producer FIFO handle.
The second operand r2 is filled by the instruction as the address to use for stores to the FIFO. This is the cache line that will get the formatted cache line discussed above. |
| open_fifo_consumer <r1> <r2> | This instruction takes in two registers, and is used to open a consumer FIFO handle to receive an actual virtual address which can be used in conjunction with a standard load instruction.
The first operand r1 is suppled as the consumer FIFO handle.
The second operand r2 is filled by the instruction as the address to use for stores to the FIFO. This is the cache line that will get the format discussed above. |
| open_fifo_broadcast_producer <r1> <r2> | This instruction takes in two registers and is used to open a producer broadcast FIFO handle to receive an actual virtual address which can be used in conjunction with a standard store instruction.
The first operand r1 is supplied as the producer FIFO handle.
The second operand r2 is filled by the instruction as the address to use for stores to the FIFO. This is the cache line that will get the formatted cache line discussed above.
This instruction/function/command conveys to the hardware (either through the hardware or through software setup of the hardware) that the lines pushed are to be broadcast to all consumers (each consumer receives a copy of the contents before line is popped) |
| open_fifo_broadcast_consumer <r1> <r2> | This instruction takes in two registers, and is used to open a consumer broadcast FIFO handle to receive an actual virtual address which can be used in conjunction with a standard load instruction.
The first operand r1 is suppled as the consumer FIFO handle.
The second operand r2 is filled by the instruction as the address to use for stores to the FIFO. This is the cache line that will get the format discussed above
The difference between this one and the other instruction/function/command is that this version conveys to the hardware (either through the hardware or through software setup of the hardware) that the lines consumed are to be broadcast from all consumers (each consumer receives a copy of the contents before line is popped). |
| optional instructions | These instructions may be used in embodiments to reduce the complexity of the link controller and (if memory storm not used) the Translation Look-aside buffer (TLB) logic. |

TABLE 1-continued

| Instruction | Description |
| --- | --- |
| push_fifo <r1> <r2> | This instruction takes the valid address returned by the open_fifo_producer instruction as r1 and a value into r2, the value is written to the FIFO associated with r1. |
| pop_fifo <r1> <r2> | This instruction takes the valid address returned by the open_fifo_consumer instruction as r1 and, on execution, places the value from the head of the FIFO into r2. This instruction could block if no values are in the FIFO or throw an error/interact with scheduler (implementation dependent). |

A virtual link buffer with LIFO order or other data link buffer may be implemented in an analogous manner.

A link buffer may provide data transfer between a producer and a single consumer or a producer and multiple consumers. In one embodiment, data is broadcast to multiple consumers so that multiple threads can share the same data values. Cache lines are pushed to the link controller to be broadcast to all consumers. Each consumer receives a copy of the contents before a line is popped. For each handle that is shared between a producer-consumer pair, a 'pop' counter is provided in the link controller. Data values are not considered to be completely 'popped' until the counter value is equal to the number of consumers. Alternatively, a bit-field may be used to identify which consumers have received the cache line.

In a potential embodiment, a link controller may also signal an execution thread scheduler upon arrival of data to a given buffer set.

On creation of a virtual link buffer (using the make_fifo instruction, for example) a virtual link buffer is registered with the producer handle stored in register <r1> and a consumer handle in register <r2>. The same handle may be used for both producer and consumer, since the directionality information can be provided through the open instruction. Alternatively, different handles may be used. An additional layer of safety is provided and decoding/checking in hardware easier if the handles are specified at the mkfifo instruction level.

Figure 8:
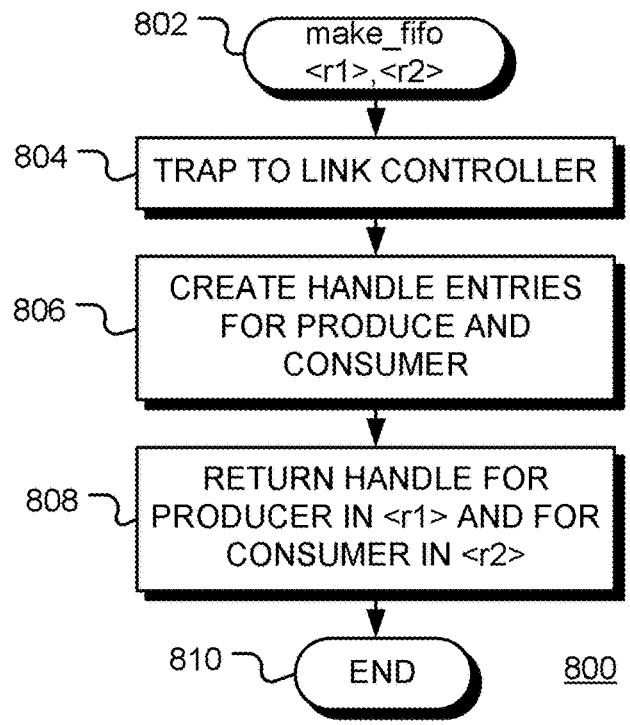
FIG. 8 is a flow chart showing operation of a 'make_fifo' instruction, in accordance with embodiments of the disclosure.

FIG. 8 is a flow chart 800 showing operation of a make_fifo instruction issued at block 802. The instruction has operands <r1> and <r2>. At block 804, the instruction is trapped to the link controller in the interconnect structure. At block 806, the link controller creates table entries for producer and consumer handles for a virtual link buffer. An embodiment of the table (224 in FIG. 1) is discussed in more detail below with reference to FIG. 12. At block 808, the producer handle is returned in the first operand, <r1>, and the consumer handle is returned in the second operand, <r2>. The operation ends at 810. In a further embodiment, assignment of the producer and consumer handles is performed by an operating system.

The make_fifo instruction initializes the virtual FIFO within the system and creates two handles in the Virtual Memory space. The handles do not correspond to real pointers and are not backed by memory of any kind. These pseudo-addresses are used as handles within the same virtual memory space to access the links created, either by the producer or the consumer. In a further embodiment the virtual addresses responded to by the hardware could be assigned by the software.

Figure 9:
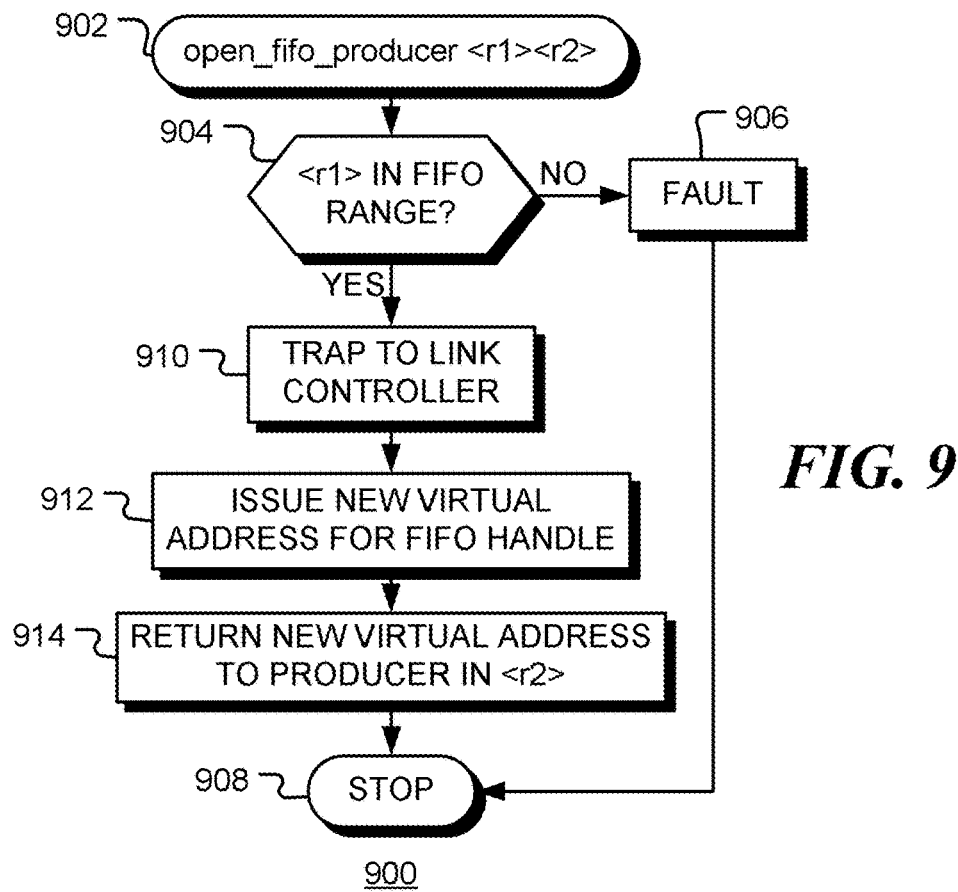
FIG. 9 is a flow chart showing operation of an 'open_fifo_producer' instruction, in accordance with embodiments of the disclosure.

FIG. 9 is a flow chart 900 showing operation of an open_fifo_producer instruction issued at block 902. The instruction has operands <r1> and <r2>. In this example, the instruction is issued by a producer device. However, an open_fifo_consumer instruction issued by a consumer device is treated in an analogous manner. In response to the instruction, a virtual link buffer is opened. At decision block 904, the pseudo-address or handle range in operand <r1> is checked to see if it is in the virtual address range reserved for virtual FIFO addresses. If it is not in a valid FIFO range, as depicted by the negative branch from decision block 904, a fault is signaled at block 906 and the process terminates at block 908. If the address or handle is in a valid FIFO range, the instruction is trapped to the link controller at block 910. At block 912, a virtual address is issued for the virtual link buffer in the reserved address range, the FIFO is registered with that address in the link controller. At block 914, the issued address is returned to the processing device in register <r2>. The returned address will identify the cache line to be formatted for use as a virtual FIFO. The process is the same for both producer and consumer devices, with the exception that the handles and virtual address are registered in the appropriate direction.

The virtual addresses returned by the link controller correspond to the start of a cache line (after translation). Each registered producer and consumer device gets a single cache line address that it will use while the FIFO exists for that producer or consumer.

In one embodiment, there may be multiple producers or consumers. The interconnect structure is used to fetch and retrieve FIFO cache lines. The FIFO lines are formatted as described above with respect to FIGS. 5-7. As detailed above, the amount of valid data stored in the cache line is saved within the cache line itself. It is noted that no modifications need be made to the normal cache coherence protocol, although further optimizations will be apparent to those of ordinary skill in the art and may result in a modified protocol.

Figure 10:
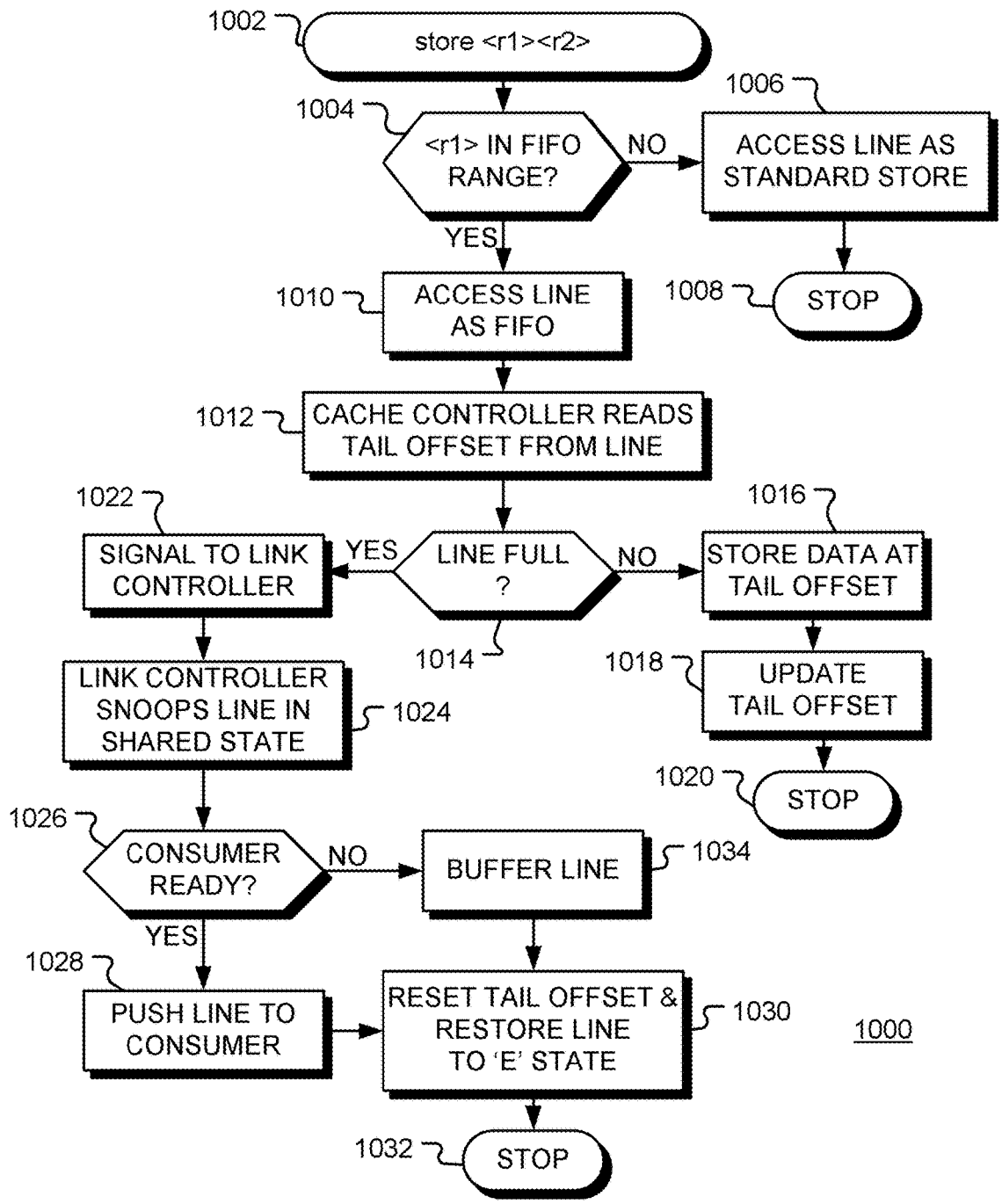
FIG. 10 is a flow chart showing operation of a store instruction, in accordance with embodiments of the disclosure.

FIG. 10 is a flow chart 1000 showing operation of a store instruction issued at block 1002. This example relates to a virtual link buffer with FIFO ordering, but other virtual link buffers may be operated in an analogous manner. The store instruction has operands <r1> and <r2>. The instruction is issued by a producer device. At decision block 1004, the virtual memory address in operand <r1> is checked to see if it is in the address range assigned to virtual FIFO handles. If it is not in a valid FIFO range, as depicted by the negative branch from decision block 1004, a standard (non-FIFO) store to the cache line is performed at block 1006 and the process terminates at block 1008. If the address or handle is in a valid FIFO range, as depicted by the positive branch from decision block 1004, the cache line as accessed as a virtual FIFO at block 1010. At block 1012 the cache controller reads the tail indicator stored in the designated region of the cache line. If tail indicator indicates that the cache line is not yet full, as depicted by the negative branch from decision block 1014, the data in operand <r2> is stored in the cache line at the location indicated by the tail indicator at block 1016. The tail indicator is updated at block 1018 and processing of the instruction is complete as indicated by termination block 1020. The tail indicator is updated by incrementing in the example cache line format described above with reference to FIG. 5. However, other formats may be used. If tail indicator indicates that the cache line is not yet full, as depicted by the positive branch from decision block 1014, the link controller is signaled at block 1022. In response, the link controller snoops the cache line in a shared state at block 1024. If a snooped consumer device indicates that it is ready to receive FIFO data, as depicted by the positive branch from decision block 1026, the full cache line is pushed from the producer device to the consumer device at block 1028. In the producer device, the tail indicator in the cache line is reset and the state of the cache line is set to exclusive ('E') at block 1030. Processing of the instruction is complete, as indicated by termination block 1032. If the snooped consumer device indicates that it is not ready to receive FIFO data, as depicted by the negative branch from decision block 1026, the full cache line is buffered at block 1034. The cache line may be buffered in virtual memory or internal SRAM, for example. In a further embodiment, the instruction is blocked until the full cache line has been transferred to the consumer device. Processing of the instruction is then complete, as indicated by termination block 1032.

Figure 11:
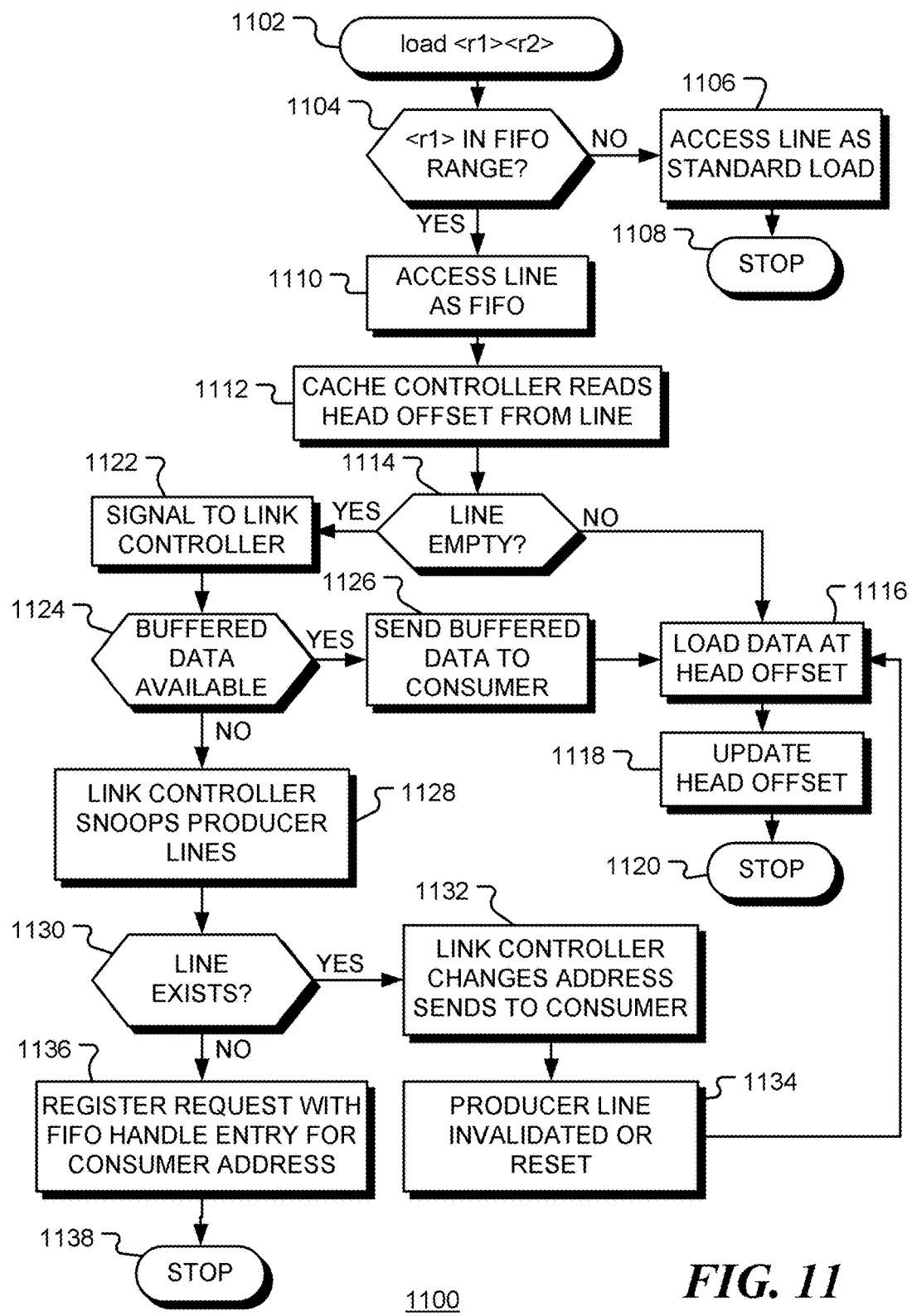
FIG. 11 is a flow chart showing operation of a load instruction, in accordance with embodiments of the disclosure.

FIG. 11 is a flow chart 1100 showing operation of a load instruction issued at block 1102. The instruction has operands <r1> and <r2>. The instruction is issued by a consumer device to load data from a virtual link buffer. At decision block 1104, the address in operand <r1> is checked to see if it is in the range of virtual addresses reserved for virtual FIFOs. In one embodiment, the address may be checked using a translation lookaside buffer (TLB). If it is not in a valid FIFO range, as depicted by the negative branch from decision block 1104, the cache line is accessed as a standard (non-FIFO) load at block 1106 and the process terminates at block 1108. If the address or handle is in a valid FIFO range, as depicted by the positive branch from decision block 1104, the cache line as accessed as a virtual FIFO at block 1110. At block 1112 the cache controller reads the head indicator stored in the designated region of the cache line. If head indicator indicates that the cache line is not empty, as depicted by the negative branch from decision block 1114, the data in operand <r2> is loaded from the cache line at the location indicated by the head indicator at block 1116. The head indicator is updated at block 1118 and processing of the instruction is complete, as indicated by termination block 1120. The head indicator may be incremented or decremented depending upon the format selected for the cache line. If head indicator indicates that the cache line is empty, as depicted by the positive branch from decision block 1114, the link controller is signaled at block 1122. In response to the signal, the link controller determines, at decision block 1124, if buffered data (stored when a producer line becomes full, for example) is available. If buffered data is available, as depicted by the positive branch from decision block 1124, the buffered cache line is sent to the consumer device at block 1126 and flow continues to block 1116. If no buffered data is available, as depicted by the negative branch from decision block 1124, the link controller snoops producer devices at block 1128 to discover filled or partially filled lines for the virtual link buffer. The snooped address is the producer address that is associated with the consumer handle. If a line exists, as depicted by the positive branch from decision block 1130, the producer device sends the line to the link controller and the link controller changes the line address from the producer address to the corresponding consumer address at block 1132. In some embodiments, the data in the received cache line may be rearranged, as discussed in the examples above. At block 1134, the cache line in the producer device is invalidated or reset to prepare for new data. Flow continues to block 1116 where the consumer device loads the data at the position in the cache line indicated by the head indicator. If no corresponding producer cache line exists, as depicted by the negative branch from decision block 1130, the request, together with the consumer FIFO handle, is registered at the link controller at block 1136 and the process terminates at block 1138. The registered request may be serviced at a later time, either in response to later snoop requests to producer devices or in response to receiving a full cache line from a producer device, for example.

Figure 12:
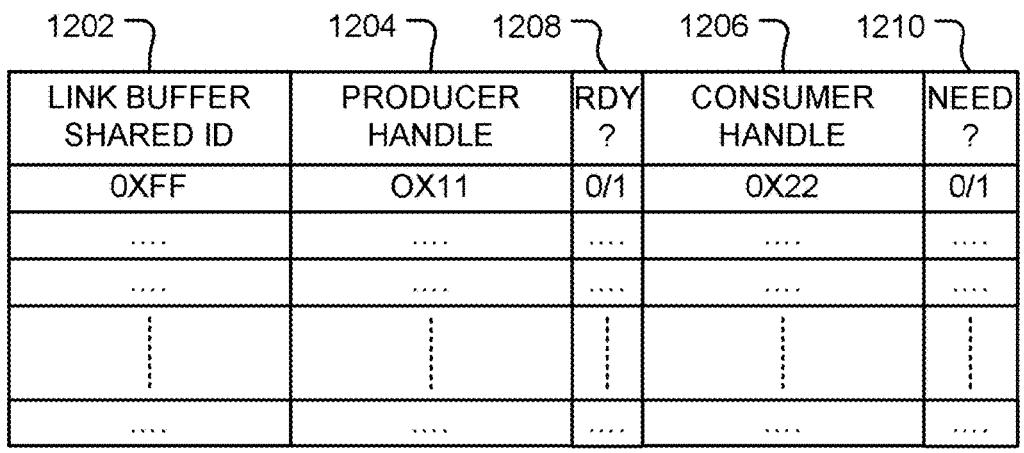
FIG. 12 shows a link controller table, in accordance with certain embodiments.

FIG. 12 shows a link controller table 224, in accordance with certain embodiments. When a virtual link with FIFO ordering is created, using the make_fifo <r1> <r2> instruction for example, an entry is made to the table 224. A shared identifier of the virtual link buffer is stored in column 1202. The identifier may be virtual memory address of the FIFO, for example. A producer handle is assigned and stored in column 1204 and a consumer handle is assigned and stored in column 1206. The handles correspond to pseudo-addresses, which in turn map the virtual link into corresponding caches of the producer and consumer device. If the virtual link is backed in virtual memory, an initial chunk of virtual memory may be allocated. Various mechanisms may be used for the allocation, for example, pre-allocation, dynamic trapping to software allocators, or the corresponding mechanisms for varying combinations of hardware/software managed memory.

Table 224 may also include bit-field 1208 that indicates if a producer cache line is ready and bit-field 1210 that indicates if a consumer device is ready to receive cache line data. In an alternative embodiment, bit-field 1210 may contain a single bit, or one bit for each consumer when the produced data is to be sent to multiple consumers.

In some embodiments, a producer cache line is transferred to a consumer cache when (a) the line is filled and the consumer is ready to receive it, or (b) when a line is at least partially filled and is requested by a consumer device.

In a further embodiment, filled producer cache lines are buffered in memory until needed by a consumer device. The buffering of cache lines increases the capacity of the link. It also serves to buffer burst-like behavior when an inter-arrival rate from producer and service processes are not deterministic. When ordering of the data in the link buffer is required, the link controller stores a buffer table that provides information for maintaining the desired order of lines. Thus, data order within a cache line is maintained by an index stored in the line itself, while data order of lines buffered in memory is maintained through use of a buffer table.

Figure 13:
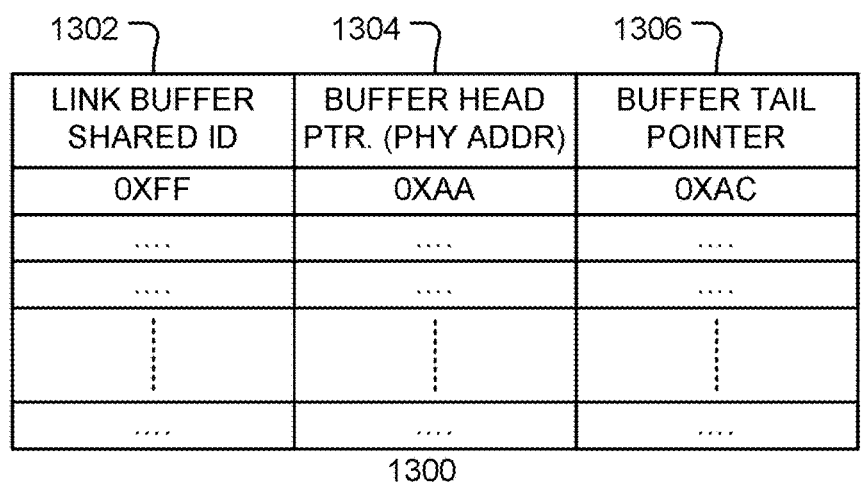
FIG. 13 shows a virtual memory FIFO table, in accordance with certain embodiments.

FIG. 13 shows a buffer table 1300 for tracking virtual link buffers that are stored in memory, in accordance with certain embodiments. Memory may be used to buffer filled producer caches lines. For each of the virtual link buffers listed in column 1302, buffer table 1300 stores a pointer to a corresponding buffer in memory in column 1304 and a tail offset in column 1306. These indicators identify the buffered lines that have been received from a producer device but not yet transferred to a consumer device. The buffered lines may be stored in a reserved region of memory. In a further embodiment, the buffered lines may be identified via a linked list or other order structure indicative of line order. When data is to be sent to multiple consumers or broadcast to all consumers, buffer table 1300 may include an entry that indicates when all designated consumers have received that data. The entry may be, for example, a counter or a bit-field that is updated when data is sent to a consumer.

Figure 14:
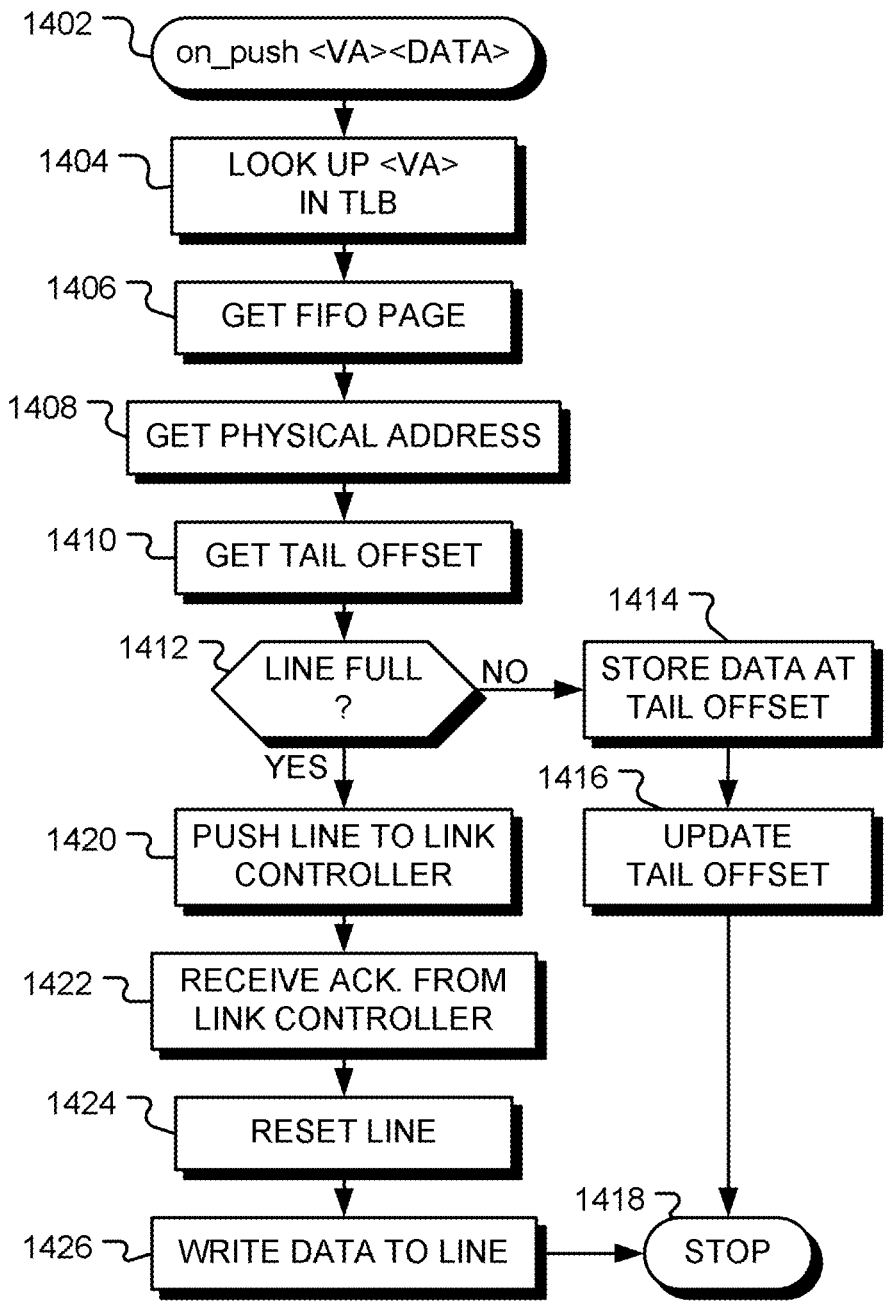
FIG. 14 is a flow chart of a method of operation of a producer device for link buffer communication, in accordance with certain embodiments.

FIG. 14 is a flow chart 1400 of a method of operation of a producer device for link buffer communication, in accordance with certain embodiments. In this embodiment, the link controller is used in conjunction with a standard virtual memory pathway. The flow chart 1400 describes an example embodiment where the link buffer is a FIFO buffer, but analogous methods may be used for other communication patterns. At block 1402 an instruction is issued from a producer device to push or store a data value <DATA> to a virtual address <VA>. The virtual address is then mapped to a corresponding physical address. In this embodiment, the virtual address <VA> is used at block 1404 to access a translation look-aside buffer (TLB). A corresponding memory page is retrieved at block 1406. At block 1408 the data line at the physical address is retrieved at block 1408 and loaded in the cache of the producer device. The data in the line may be formatted as described above. At block 1410, the tail index is read from the assigned position in the formatted cache line. The tail index may indicate the number of valid entries in the cache line and/or the position in the line for the next store operation. If the tail index indicates that the cache line is not full, as depicted by the negative branch from decision block 1412, the data value <DATA> is stored, at block 1414, at the indicated position in the cache line and the tail index is updated at block 1416. The response to the push instruction terminates at block 1418. If, however, the tail index indicates that the cache line is full, as depicted by the positive branch from decision block 1412, the cache line is pushed to the link controller at block 1420. At 1422, an 'acknowledge' signal is received from the link controller to indicate receipt of the cache line and the cache line is reset at block 1424. At block 1426, the data value <DATA> is written to the first entry in the cache line and the tail index is updated accordingly. The response to the push instruction terminates at block 1418. In this way, the producer device is able to write data to the virtual link buffer.

Figure 15:
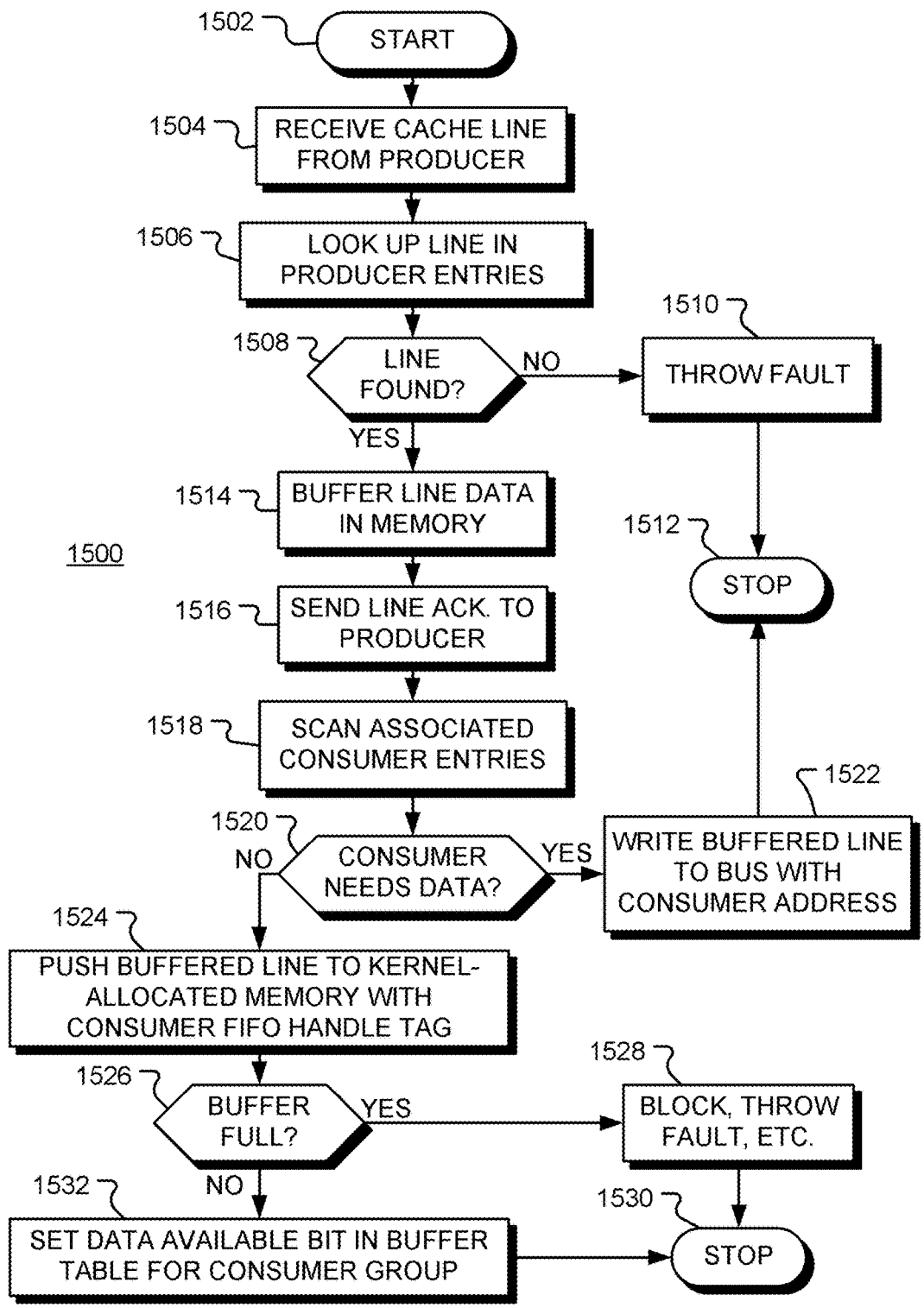
FIG. 15 is a flow chart of a method of operation of a link controller for link buffer communication, in accordance with certain embodiments.

FIG. 15 is a flow chart 1500 of a method of operation of a link controller for link buffer communication, in accordance with certain embodiments. Following start block 1502, the link controller receives a full cache line from a producer device at block 1504. At block 1506, the line address is looked-up in a producer content addressable memory (CAM) or similar. If a corresponding memory address is not found, as determined by the negative branch from decision block 1508, a fault is indicated at block 1510 and the method terminates at bock 1512. If a corresponding memory address is found, as determined by the positive branch from decision block 1508, the received cache line data is buffered in the memory at block 1514 and an 'acknowledge' signal is sent to the producer device at block 1516. At block 1518, the consumer list associated with the producer is identified in the link controller table. The identified consumer list is scanned to determine if a consumer has requested the received data. If a consumer device has requested the data, as depicted by the positive branch from decision block 1520, the buffered line is written to the interconnect bus consumer and directed towards the address of the requesting consumer device at block 1522. The method terminates at block 1512. If no consumer has requested the data, as depicted by the negative branch from decision block 1520, the buffered line is pushed to memory (such as DRAM) at block 1524 and addressed with the consumer tag for the virtual link buffer. The memory may be allocated by the operating system kernel, for example. The data may also be buffered if there are multiple consumers of the data and not all are ready to receive the data. In this case, an entry in the link controller table identifies the number of consumer that have received the data or which consumers have received the data. If the memory buffer is full, as depicted by the positive branch from decision block 1526, flow continues to block 1528 where receipt of further cache lines may be blocked, a fault may be thrown or some other action may be taken. The process terminates at block 1530. If the memory buffer is not full, as depicted by the negative branch from decision block 1526, a 'data available' bit (e.g. 1208 in FIG. 12) is set to signal to the one or more consumers that data is available in the memory buffer at block 1532, and the process terminates at block 1530.

Figure 16:
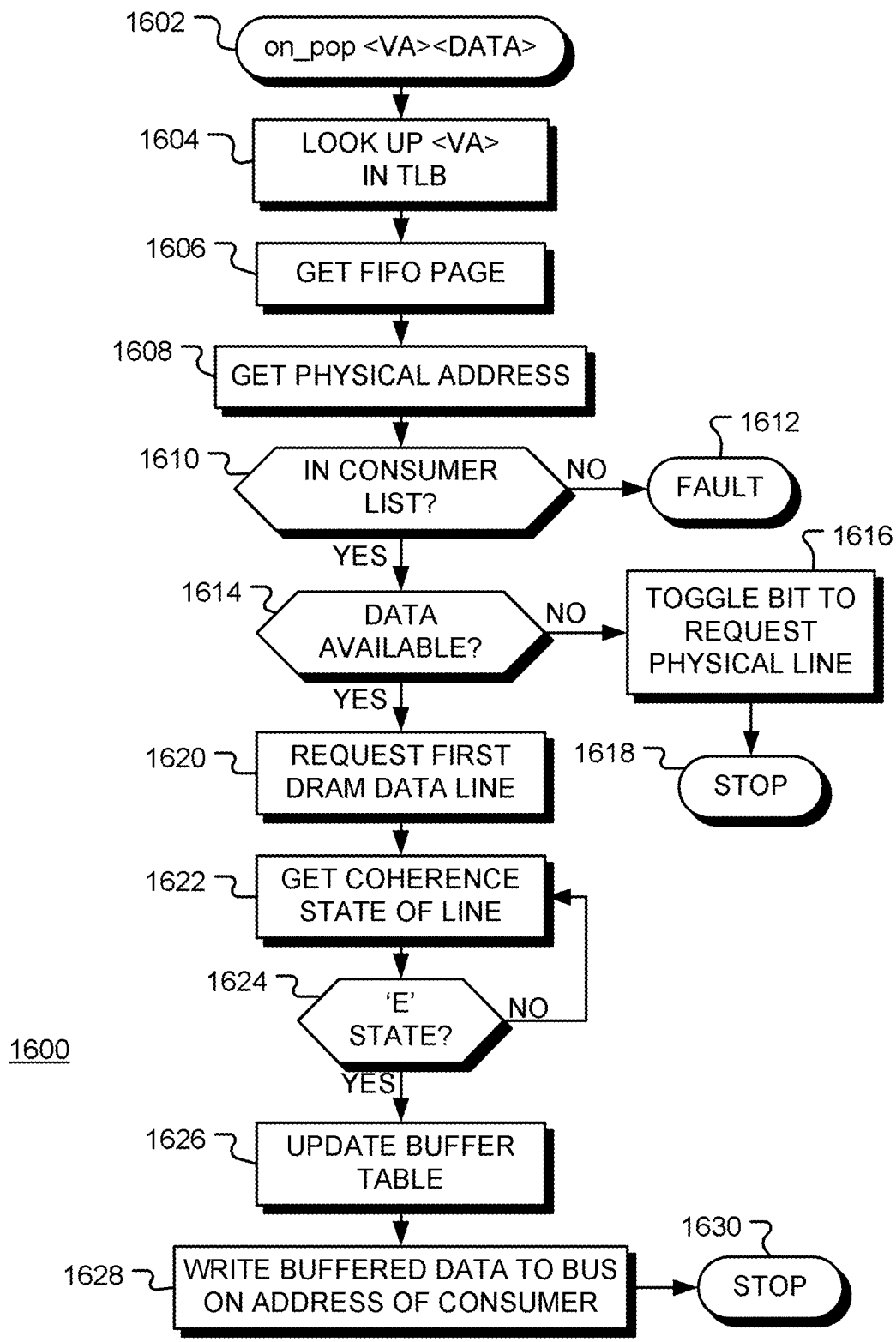
FIG. 16 is a flow chart of a method of operation of a link controller for link buffer communication, in accordance with certain embodiments.

FIG. 16 is a further flow chart 1600 of a method of operation of a link controller for link buffer communication, in accordance with certain embodiments. At block 1602 an instruction is issued from a consumer device to pop or load a data value <DATA> from a virtual address <VA>. The virtual address is then mapped to a corresponding physical address. In this embodiment, the virtual address <VA> is used at block 1604 to access a translation look-aside buffer (TLB). A corresponding memory page is retrieved at block 1606 and the physical address is retrieved at block 1608. If the line at the physical address is not found in the list of consumers in the table maintained by the link controller, as depicted by the negative branch from decision block 1610, a fault is deemed to have occurred. A selected action is performed and the method terminates at block 1612. If the physical address is found in the list of consumers in the table maintained by the link controller, as depicted by the positive branch from decision block 1610, a 'data ready' bit in the link controller table (1208 in FIG. 12, for example) is checked at block 1614 to determine if data is available from a producer device. If no data is available, as depicted by the negative branch from decision block 1614, a 'need data' bit (1210 in FIG. 12, for example) is set to indicate a request for data at block 1616 and the method terminates at block 1618. If data is available, as depicted by the positive branch from decision block 1614, the next data line is retrieved from the buffer memory at block 1620. If the data is being shared between a number of consumer devices, a coherence state is associated with the line. The coherence state is checked at block 1622. If the coherence state indicates that the line is exclusively owned ('E') the buffer table is updated at block 1626 to indicate the new buffer head, the 'need data' bit is cleared, and the data line is transferred with the address of the requesting consumer device at block 1628. The response to the request is complete and the method terminates at block 1630. If the coherence state indicates that the line is not exclusively owned ('E'), as depicted by the negative branch from decision block 1624, the link controller waits until the state becomes exclusive.

Figure 17:
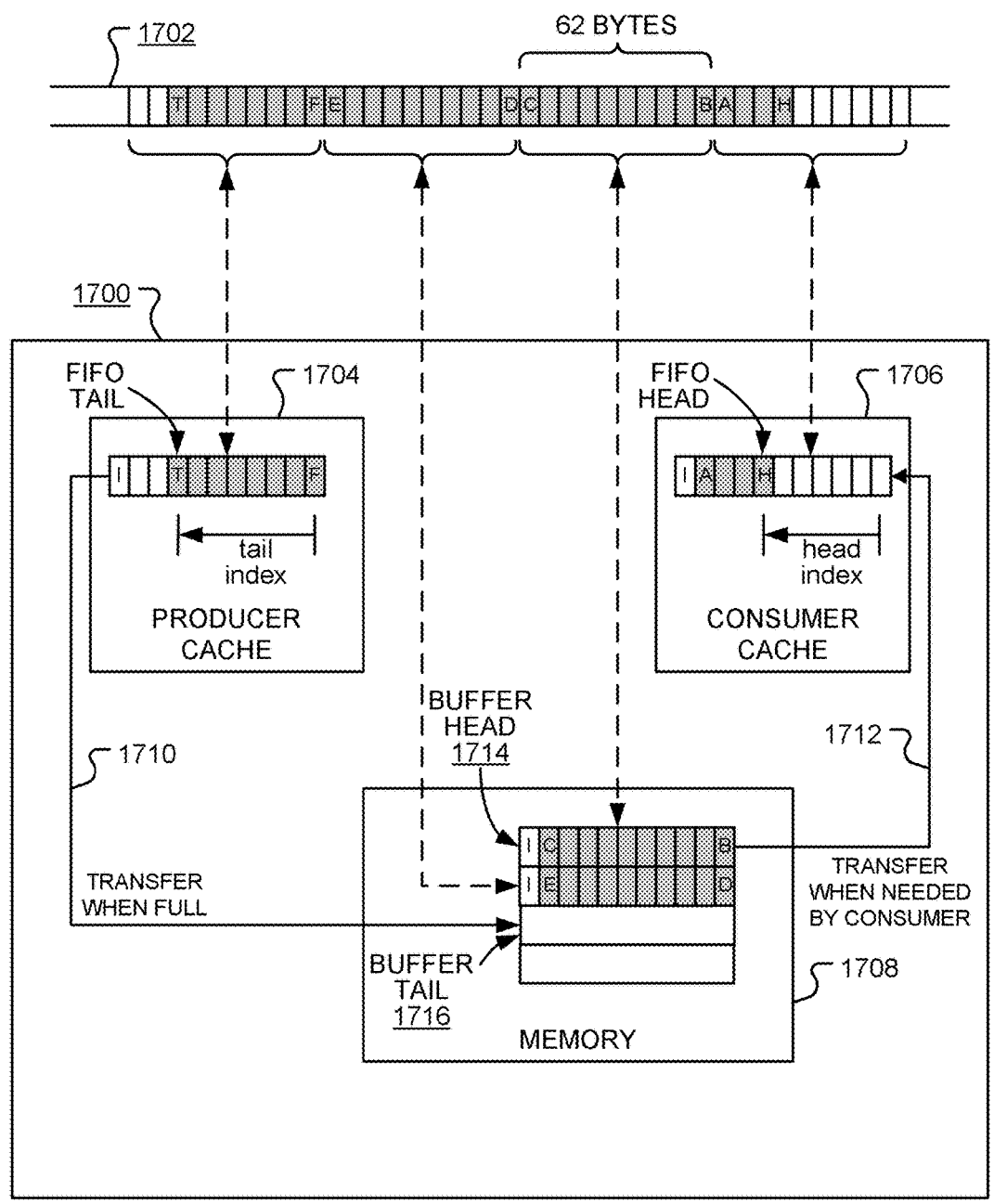
FIG. 17 is a diagrammatic representation of data processing system that implements a virtual FIFO buffer, in accordance with certain embodiments.

FIG. 17 is a diagrammatic representation of data processing system 1700 that implements a virtual FIFO buffer 1702. Virtual FIFO buffer 1702 has a number of data entries indicated by the grayed locations. The first entry is the head entry denoted as 'H' and the last or most recent entry is the tail entry denoted 'T'. These positions vary as data is written to or read from the FIFO buffer, so FIG. 17 represents the configuration at a particular moment in time. In this embodiment, the data processing system 1700 includes a producer cache 1704, a consumer cache 1706 and a memory 1708. A cache line contains 64 bytes in this example, of which 62 bytes contain data and 2 bytes contain metadata. The virtual buffer 1702 is divided into several sections of length 62 bytes. At the time shown, the oldest section, which includes entries H-A, is stored as a line in the consumer cache 1706 for access by the consumer device, section B-C and section D-E are stored in memory 1708 and the most recent section with entries F-T is stored in a line of the producer cache 1704 and is updated by the producer device 1704. Each cache line stores two bytes of metadata that include a tail or head index 'I' that is updated by the cache controller of the associated device. When a line in the producer cache is filled, it transferred to the link controller as described above with reference to FIG. 14 and as indicated by arrow 1710 in FIG. 17. When a consumer requests more FIFO data the request is serviced by the link controller as described above with reference to FIG. 16 and as indicated by arrow 1712 in FIG. 17.

Cache line data received from the producer cache may be buffered in memory by the link controller, as described with reference to FIG. 15. In FIG. 17, section B-C and section D-E are buffered in memory 1708. The order of the buffered lines may be maintained by the link controller. In the example embodiment shown, buffered lines are stored consecutively. Buffer head pointer 1714 is updated when lines are transferred to the consumer and buffer tail pointer 1716 are updated as lines as received from the producer. In a further embodiment, the order of the buffered lines is maintained by a linked list or other equivalent data structure capable or maintaining order of link buffer data in memory).

The integrated circuits disclosed above may be defined as a set of instructions of a Hardware Description Language (HDL). The instructions may be stored in a non-transient computer readable medium. The instructions may be distributed via the computer readable medium or via other means such as a wired or wireless network. The instructions may be used to control manufacture or design of the integrated circuit, and may be combined with other instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing X includes any suitable method for causing another party such as a remote user, a remote processing resource (e.g., a server or cloud computer) or a machine to perform X. Similarly, performing elements X, Y, and Z may include any method of directing or controlling any combination of such other individuals or resources to perform element X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A data processing system for providing a hardware-accelerated virtual link buffer, the data processing system comprising:
a first cache accessible by a first processing device;
a second cache accessible by a second processing device; and
an interconnect structure that couples the first cache and the second cache, the interconnect structure comprising a link controller;
where the first cache is configured to store a plurality of data elements produced by the first processing device in a producer cache line;
where the link controller comprises hardware configured to transfer data elements in the producer cache line to a consumer cache line in the second cache; and
where the second cache is configured to access a consumer cache line to provide the plurality of data elements, produced by the first processing device, to the second processing device.

2. The data processing system of item 1, further comprising a first cache controller, where the plurality of data elements are produced in sequence, where a data element of the plurality of data elements is stored at a location in the producer cache line indicated by a store position indicator, where the store position indicator is stored at a predetermined location in the producer cache line and where the first cache controller is configured to access the store position indicator.

3. The data processing system of item 1, further comprising a second cache controller where a data element of the plurality of data elements is loaded from a location in the consumer cache line indicated by a load position indicator, where the load position indicator is stored at a predetermined location in the consumer cache line and where the second cache controller is configured to access the load position indicator.

4. The data processing system of item 1, further comprising a memory, where the producer cache line is associated with a producer handle and where the consumer cache line is associated with a consumer handle, where the producer handle and the consumer handle are stored in a table in the memory and where the table is accessible by the link controller.

5. The data processing system of item 1, further comprising a memory, where the link controller is configured to buffer data elements transferred from the producer cache line to the consumer cache line in the memory.

6. The data processing system of item 5, where the link controller is configured to maintain an order of buffered data elements.

7. The data processing system of item 1, where the link controller is configured to transfer data elements in the producer cache line to consumer cache lines in second caches of a plurality of second processing devices.

8. The data processing system of item 1, further comprising the first processing device and the second processing device.

9. A method for providing a virtual link buffer between a producer processing device and a consumer processing device in a data processing system, the method comprising:
   allocating a first virtual address for identifying a cache line in a cache of the producer processing device;
   allocating a second virtual address for identifying a cache line in a cache of the consumer processing device;
   storing, by the producer processing device, one or more data elements in a first cache line of the producer processing device, the first cache line identified by the first virtual address;
   transferring, by a link controller in an interconnect structure that couples the producer and consumer processing devices, the one or more data elements in the first cache line to a second cache line in the cache of the consumer processing device, the second cache line identified by the second virtual address; and
   loading, by the consumer processing device, the one or more data elements from the second cache line.

10. The method of item 9, where storing, by the producer processing device, a data element of the one or more data elements in the first cache line of the producer processing device comprises:
   reading a store position indicator from a designated location in the first cache line;
   storing the data element at a location in the first cache line indicated by the store position indicator; and
   updating the store position indicator in the first cache line.

11. The method of item 10, where updating the store position indicator comprises:
   reading a data element size from a designated location in the first cache line; and
   modifying the store position indicator dependent upon the data element size.

12. The method of item 9, where the first cache line includes a plurality of error correction code (ECC) bits associated with data locations in the first cache line and where storing, by the producer processing device, a data element of the one or more data elements in the first cache line of the producer processing device comprises:
   storing the data element at a first location in the first cache line indicated by the store position indicator; and
   updating an ECC bit, of the plurality of ECC bits, associated with in the first location to indicate that data at the first location is valid.

13. The method of item 9, where loading, by the consumer processing device, the one or more data elements from the second cache line comprises:
   reading a load position indicator from a designated location in the second cache line;
   loading the data element at a location in the second cache line indicated by the load position indicator; and
   updating the load position indicator in the second cache line.

14. The method of item 9, where storing, by the producer processing device, one or more data elements in the first cache line of the producer processing device comprises:
   translating the first virtual address to a first intermediate address in a storage device of the data processing system; and
   identifying the first cache line from the first intermediate address.

15. The method of item 9, further comprising:
   allocating, by the link controller, a producer handle comprising a pseudo-address for enabling the producer processing device to reference the virtual link buffer;
   allocating, by the link controller, a consumer handle comprising a pseudo-address for enabling the consumer processing device to reference the virtual link buffer; and
   associating, by the link controller, the producer handle with the consumer handle.

16. The method of item 9, where transferring the one or more data elements in the first cache line of the producer processing device to the second cache line in the cache of the consumer processing device comprises:
   transferring the first cache line to the link controller;
   storing, by the link controller, the first cache line in a line buffer in a memory of the data processing system; and
   transferring the first cache line from the line buffer to the second cache line of the consumer processing device.

17. The method of item 16 where the line buffer comprises a first-in, first-out line buffer.

18 The method of item 16, where the line buffer comprises a first-in, last-out line buffer.

19. The method of item 16, where the line buffer comprises an unordered buffer.

20. The method of item 16, further comprising the link controller maintaining an order of lines stored in the line buffer by accessing a memory, where the memory contains one or more of a table, a head pointer, a tail pointer or a linked list.

21. The method of item 16, further comprising maintaining a coherence state of the first cache line transferred from the producer to the link controller and stored in the line buffer.

22. The method of item 9, where transferring the one or more data elements in the first cache line to the second cache line comprises the link controller:
   receiving a request from the consumer processing device for data associated with the second virtual address allocated to the virtual link buffer;
   determining if one or more cache lines associated with the virtual link buffer are stored the line buffer;

when one or more cache lines associated with the virtual link buffer are stored the line buffer:
  selecting a cache line of the one or more stored caches lines; and
  transferring one or more data elements in the selected cache line from the line buffer to the consumer processing device.

23. The method of item 9 where transferring the one or more data elements in the first cache line to the second cache line comprises the link controller:
  receiving a request from the consumer processing device for data associated with the second virtual address allocated to the virtual link buffer;
  identifying the first virtual address allocated to the virtual link buffer;
  requesting a cache line associated with the identified first virtual address from the producer processing device; and
  transferring a cache line received from the producer processing device to the consumer processing device.

24. The method of item 23, where requesting the cache line associated with the identified first virtual address from the producer processing device comprises requesting a cache line associated with a physical address that maps to the identified first virtual address.

25. The method of item 9, further comprising:
  reading a store position indicator from a designated location in the first cache line; and
  determining from the store position indicator if the first cache line is full;
where transferring the one or more data elements in the first cache line of the producer processing device to a second cache line in the cache of the consumer processing device comprises:
  transferring the first cache line to the link controller when the first cache line is full.

26. The method of item 9, further comprising transferring the first cache line from the buffer in memory to the cache line of the second cache line in response to a signal from the consumer processing device.

27. The method of item 9, where transferring, by link controller, the one or more data elements in the first cache line to the second cache line comprises:
  rearranging, by the link controller, the position or order of the one or more data elements in the cache line.

28. A method for providing a virtual link buffer between a producer processing device and a consumer processing device in a data processing system, the method comprising:
  allocating a first virtual address for identifying a cache line in a cache of the producer processing device;
  allocating a second virtual address for identifying a cache line in a cache of the consumer processing device, where the second virtual address is associated with the first virtual address;
  receiving a first cache line associated with the first virtual address from the producer processing device, the first cache line comprising one or more data elements stored by the producer processing device, the first cache line identified by the first virtual address;
  determining the second virtual address associated with the first virtual address; and
  transferring the first cache line with the second virtual address to the consumer processing device.

29. The method of item 28, where determining the second virtual address associated with the first virtual address comprises accessing a table of virtual address pairs.

30. The method of item 28, where determining the second virtual address associated with the first virtual address comprises accessing a second virtual address encoded in the first cache line.

31. The method of item 28, where transferring the first cache line with the second virtual address to the consumer processing device comprises buffering the first cache line in a memory.

32. A method for providing a virtual link buffer between a producer processing device and a plurality of consumer processing devices in a data processing system, the method comprising:
  allocating a first virtual address for identifying a cache line in a cache of the producer processing device;
  storing, by the producer processing device, one or more data elements in a first cache line of the producer processing device, the first cache line identified by the first virtual address;
  transferring the one or more data elements in the first cache of the producer processing device to a link controller of the data processing system;
  storing, by the link controller, the received one or more data elements;
  transferring, by the link controller, the one or data elements to one or more consumer processing devices of the plurality of consumer processing devices; and
  determining if the one or more data elements have been transferred to all of the plurality of consumer processing devices.

33. The method of item 32, where determining if the one or more data elements have been transferred to all of the plurality of consumer processing devices comprises the link controller maintaining a count of devices to which the one or more data elements have been transferred.

34. The method of item 32, where determining if the one or more data elements have been transferred to all of the plurality of consumer processing devices comprises the link controller maintaining a bit-map of devices to which the one or more data elements have been transferred.

35. The method of item 32, where transferring, by the link controller, the one or data elements to a consumer processing device of the plurality of consumer processing devices is performed in response to a request from that consumer processing device.

The invention claimed is:

1. A data processing system for providing a hardware-accelerated virtual link buffer, the data processing system comprising:
  a first cache accessible by a first processing device;
  a second cache accessible by a second processing device; and
  an interconnect structure that couples the first cache and the second cache, the interconnect structure comprising a link controller;
where the first cache is configured to store a plurality of data elements produced by the first processing device in a producer cache line;
where the link controller comprises hardware configured to transfer the data elements stored in the producer cache line to a consumer cache line in the second cache;
where the second cache is configured to access the consumer cache line to provide the plurality of data elements, produced by the first processing device, to the second processing device,
where the first cache comprises a level one (L1) cache of the first processing device and is not shared with the second processing device; and where the second cache comprises an L1 cache of the second processing device and is not shared with the first processing device.

2. The data processing system of claim 1, further comprising a memory, where the producer cache line is associated with a producer handle and where the consumer cache line is associated with a consumer handle, where the producer handle and the consumer handle are stored in a table in the memory and where the table is accessible by the link controller.

3. The data processing system of claim 1, further comprising a memory, where the link controller is configured to buffer the data elements transferred from the producer cache line to the consumer cache line in the memory.

4. The data processing system of claim 3, where the link controller is configured to maintain an order of the buffered data elements.

5. The data processing system of claim 1, where the link controller is configured to transfer the data elements in the producer cache line to consumer cache lines in second caches of a plurality of second processing devices.

6. The data processing system of claim 1, further comprising the first processing device and the second processing device.

7. A data processing system for providing a hardware-accelerated virtual link buffer, the data processing system comprising:
 a first cache accessible by a first processing device;
 a second cache accessible by a second processing device; and
 an interconnect structure that couples the first cache and the second cache, the interconnect structure comprising a link controller;
where the first cache is configured to store a plurality of data elements produced by the first processing device in a producer cache line;
where the link controller comprises hardware configured to transfer data elements in the producer cache line to a consumer cache line in the second cache; and
where the second cache is configured to access a consumer cache line to provide the plurality of data elements, produced by the first processing device, to the second processing device;
the data processing system further comprising a first cache controller, where the plurality of data elements are produced in sequence, where a data element of the plurality of data elements is stored at a location in the producer cache line indicated by a store position indicator, where the store position indicator is stored at a predetermined location in the producer cache line and where the first cache controller is configured to access the store position indicator.

8. The data processing system of claim 7, further comprising a second cache controller where a data element of the plurality of data elements is loaded from a location in the consumer cache line indicated by a load position indicator, where the load position indicator is stored at a predetermined location in the consumer cache line and where the second cache controller is configured to access the load position indicator.

9. A method for providing a virtual link buffer between a producer processing device and a consumer processing device in a data processing system, the method comprising:
 allocating a first virtual address for identifying a cache line in a cache of the producer processing device;
 allocating a second virtual address for identifying a cache line in a cache of the consumer processing device;
 storing, by the producer processing device, one or more data elements in a first cache line of the producer processing device, the first cache line identified by the first virtual address;
 transferring, by a link controller in an interconnect structure that couples the producer and consumer processing devices, the one or more data elements in the first cache line to a second cache line in the cache of the consumer processing device, the second cache line identified by the second virtual address; and
 loading, by the consumer processing device, the one or more data elements from the second cache line,
where storing, by the producer processing device, a data element of the one or more data elements in the first cache line of the producer processing device comprises:
 reading a store position indicator from a designated location in the first cache line;
 storing the data element at a location in the first cache line indicated by the store position indicator; and
 updating the store position indicator in the first cache line.

10. The method of claim 9, where updating the store position indicator comprises:
 reading a data element size from a designated location in the first cache line; and
 modifying the store position indicator dependent upon the data element size.

11. The method of claim 9, where the first cache line includes a plurality of error correction code (ECC) bits associated with data locations in the first cache line and where storing, by the producer processing device, a data element of the one or more data elements in the first cache line of the producer processing device comprises:
 storing the data element at a first location in the first cache line indicated by the store position indicator; and
 updating an ECC bit, of the plurality of ECC bits, associated with in the first location to indicate that data at the first location is valid.

12. The method of claim 9, where loading, by the consumer processing device, the one or more data elements from the second cache line comprises:
 reading a load position indicator from a designated location in the second cache line;
 loading a data element of the one or more data elements at a location in the second cache line indicated by the load position indicator; and
 updating the load position indicator in the second cache line.

13. The method of claim 9, where storing, by the producer processing device, the one or more data elements in the first cache line of the producer processing device comprises:
 translating the first virtual address to a first intermediate address in a storage device of the data processing system; and
 identifying the first cache line from the first intermediate address.

14. The method of claim 9, further comprising:
 allocating, by the link controller, a producer handle comprising a pseudo-address for enabling the producer processing device to reference the virtual link buffer;
 allocating, by the link controller, a consumer handle comprising a pseudo-address for enabling the consumer processing device to reference the virtual link buffer; and
 associating, by the link controller, the producer handle with the consumer handle.

15. The method of claim 9, where transferring the one or more data elements in the first cache line of the producer processing device to the second cache line in the cache of the consumer processing device comprises:
  transferring the first cache line to the link controller;
  storing, by the link controller, the first cache line in a line buffer in a memory of the data processing system; and
  transferring the first cache line from the line buffer to the second cache line of the consumer processing device.

16. The method of claim 15 where the line buffer comprises a buffer selected from the group of buffers consisting of a first-in, first-out line buffer, a first-in, last-out line buffer and an unordered buffer.

17. The method of claim 15, further comprising the link controller maintaining an order of lines stored in the line buffer by accessing a memory, where the memory contains one or more of a table, a head pointer, a tail pointer or a linked list.

18. The method of claim 9, where transferring the one or more data elements in the first cache line to the second cache line comprises the link controller:
  receiving a request from the consumer processing device for data associated with the second virtual address allocated to the virtual link buffer;
  determining if one or more cache lines associated with the virtual link buffer are stored the line buffer;
  when one or more cache lines associated with the virtual link buffer are stored the line buffer:
    selecting a cache line of the one or more stored caches lines; and
    transferring the one or more data elements in the selected cache line from the line buffer to the consumer processing device.

19. The method of claim 9 where transferring the one or more data elements in the first cache line to the second cache line comprises the link controller:
  receiving a request from the consumer processing device for data associated with the second virtual address allocated to the virtual link buffer;
  identifying the first virtual address allocated to the virtual link buffer;
  requesting a cache line associated with the identified first virtual address from the producer processing device; and
  transferring a cache line received from the producer processing device to the consumer processing device.

20. The method of claim 9, further comprising:
  reading a store position indicator from a designated location in the first cache line; and
  determining from the store position indicator if the first cache line is full;
where transferring the one or more data elements in the first cache line of the producer processing device to a second cache line in the cache of the consumer processing device comprises:
  transferring the first cache line to the link controller when the first cache line is full.

21. A method for providing a virtual link buffer between a producer processing device and a consumer processing device in a data processing system, the method comprising:
  allocating a first virtual address for identifying a cache line in a cache of the producer processing device;
  allocating a second virtual address for identifying a cache line in a cache of the consumer processing device, where the second virtual address is associated with the first virtual address;
  receiving a first cache line associated with the first virtual address from the producer processing device, the first cache line comprising one or more data elements stored by the producer processing device, the first cache line identified by the first virtual address;
  determining the second virtual address associated with the first virtual address; and
  transferring the first cache line with the second virtual address to the consumer processing device,
where the cache of the producer processing device comprises a level one (L1) cache and is not shared with the consumer processing device; and
where the cache of the consumer processing device comprises an L1 cache and is not shared with the producer processing device.

22. The method of claim 21, where determining the second virtual address associated with the first virtual address comprises accessing a table of virtual address pairs.

23. The method of claim 21, where determining the second virtual address associated with the first virtual address comprises accessing a second virtual address encoded in the first cache line.

24. The method of claim 21, where transferring the first cache line with the second virtual address to the consumer processing device comprises buffering the first cache line in a memory.

* * * * *